Jan. 7, 1947.  J. C. MARTIN  2,413,986
RETRACTABLE AIRCRAFT UNDERCARRIAGE
Filed July 3, 1945  2 Sheets-Sheet 1

INVENTOR
JOSEPH C. MARTIN

Jan. 7, 1947. J. C. MARTIN 2,413,986
RETRACTABLE AIRCRAFT UNDERCARRIAGE
Filed July 3, 1945 2 Sheets-Sheet 2

INVENTOR
JOSEPH C. MARTIN

Patented Jan. 7, 1947

2,413,986

UNITED STATES PATENT OFFICE 2,413,986

RETRACTABLE AIRCRAFT UNDERCARRIAGE

Joseph Cleo Martin, United States Army

Application July 3, 1945, Serial No. 603,007
In Great Britain December 13, 1944

1 Claim. (Cl. 244—102)

This invention relates to improvements in retractable aircraft undercarriages and has for its primary object to provide mechanism by means of which only a comparatively light effort is required to move the undercarriage to its extended or retracted position.

Broadly, according to the present invention, an undercarriage retractable into a well of an aircraft, comprises a main shock strut pivoted at its upper end to the aircraft and carrying a landing wheel at its lower end, a drag strut including toggle arms connected at their outer ends respectively to the aircraft and the main shock strut, a toggle pivot pin connecting the inner ends of said arms, said arms assuming substantially rectilinear alinement oblique to the main shock strut and the horizontal axis of the aircraft when the said main shock strut is in its landing position, an actuating member reciprocably mounted on the aircraft parallel to the horizontal axis thereof, a control link having its ends pivotally connected to the toggle pivot pin and to said actuating member, and a prime mover adapted to reciprocate the actuating member to cause it to pull the control link and break the alinement of the toggle arms by moving the toggle pivot pin into the well and swinging the main shock strut upwards.

Any suitable prime mover may be employed for operating the reciprocable actuating member. For example such prime mover may comprise a reversible electric motor, a hydraulic jack, or any other suitable source of power.

In order that the said invention may be clearly understood, an embodiment thereof will be described by way of example with the aid of the accompanying drawings, wherein—

Figure 1:
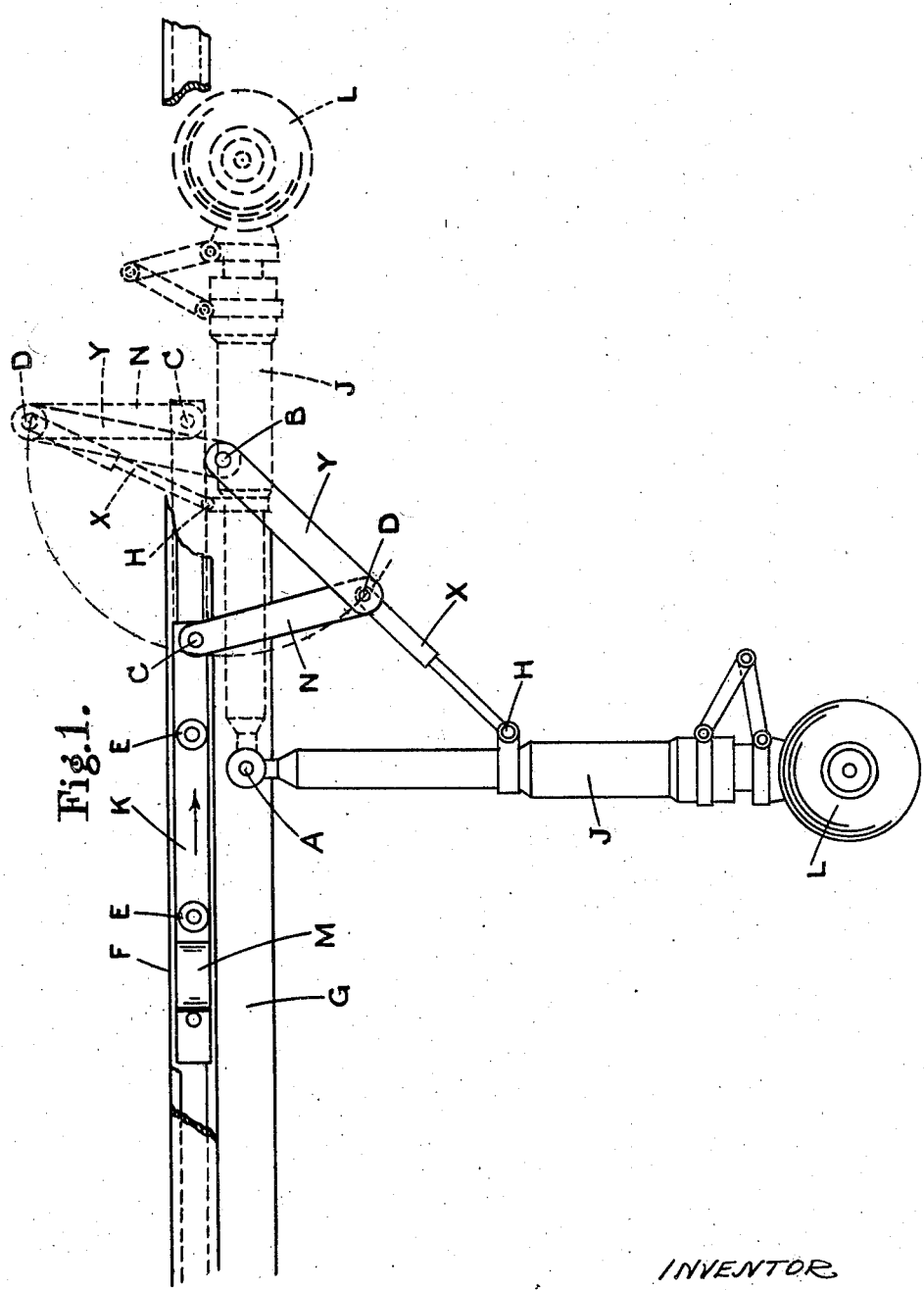
Figure 1 is a side elevation showing in full lines the undercarriage extended ready for landing, and in broken lines the same in its retracted position.

Referring to the drawings G represents the lip of the well of an aircraft and F a runway rigidly secured in the well, whilst K is an actuating member in the form of a slider carried by runners E in said runway, and disposed approximately parallel to the axis of the aircraft. This actuating member K is attached to any suitable mechanism under the control of a suitable prime mover. In the example, movement of the actuating member towards the right of Figure 1 retracts the undercarriage.

Figure 2:
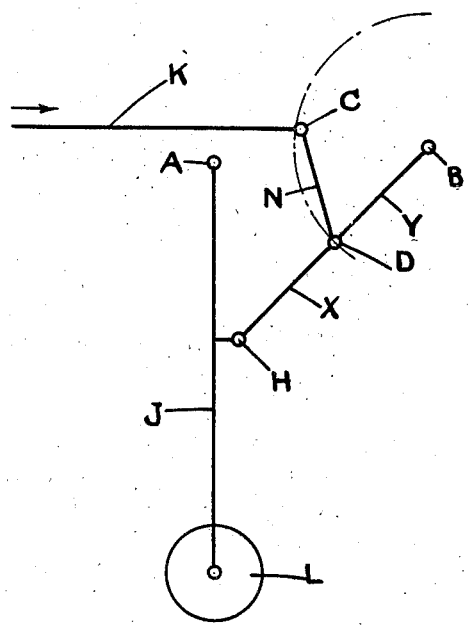
Figures 2–5 are diagrams depicting the action of the apparatus by indicating the parts in the positions according to the two shown in Figure 1 and also in two intermediate positions.

The undercarriage, viewed sideways and in the extended position of Figures 1 and 2, comprises a main shock strut J carrying a landing wheel or the equivalent L at its lower or outer end and is pivoted at its upper or inner end on a spindle A extending transversely across the housing or well G in the aircraft structure into which the undercarriage is capable of being retracted.

To each longitudinal wall of the housing or well there is secured the aforesaid runway F in which engages the runners E carrying the horizontally reciprocable actuating member K. The pair of reciprocable actuating members K thus provided are bent towards one another at one end M and are connected or bridged at such ends to provide an anchorage for connecting the members to the prime mover mechanism not shown.

The main shock strut J is further connected to the aircraft structure by an inclined toggle jointed drag strut comprising two arms X and Y pivoted together by their inner ends to a toggle pivot pin D, and at their remote ends the lower arm X of the strut is pivoted to the main shock strut at H and the upper arm to a pivot B fixed in relation to the aircraft structure.

The means for "breaking" or "extending" the toggle jointed drag strut comprises duplicate control links N pivoted at their upper ends at C one to each of the reciprocable actuating members K so as to be moved along with the latter and these control links are bent towards one another stirrup fashion and pivoted at their lower ends of the toggle pivot pin D of the drag strut.

Figure 3:
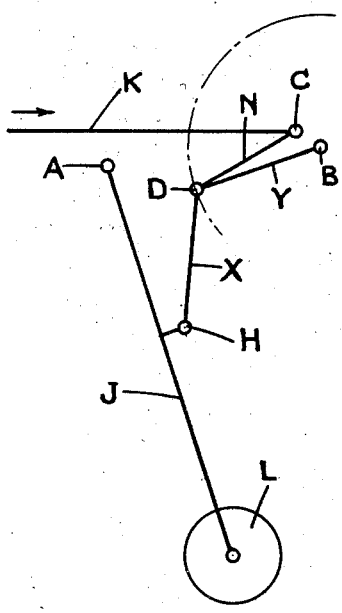
Figure 4:
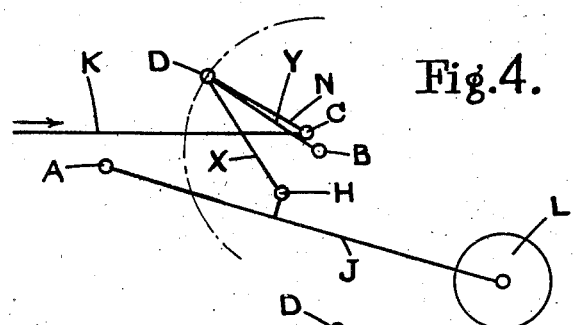
Figure 5:
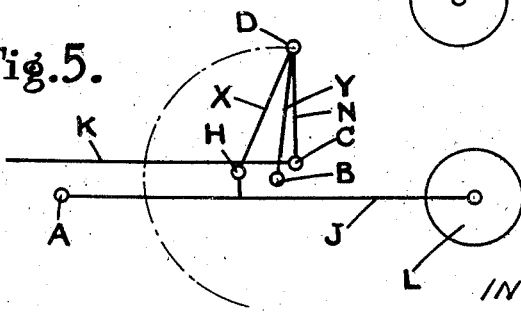

The operation of the apparatus is as follows: Assuming the undercarriage is to be retracted into the housing or well from an extended position shown in full lines in Figure 1 and in the diagram Figure 2, the actuating members K are slid towards the right and during their initial movement exert a pull on the duplicate control links N to break the toggle joint of the drag strut XY which immediately commences to collapse as seen in Figure 3. During continued sliding movement of said actuating member the control links N are carried along by said member and are caused to turn about their pivots on the slidable members due to the fact that the upper arm Y of the toggle jointed drag strut is carried at one end by the fixed pivot pin B on the aircraft structure, and that therefore the toggle joint of said strut always moves through an arc struck from the centre of said fixed pivot. Thus one pair of ends C of the control links N are pulled along horizontally with the actuating member K whilst the other pair of ends connected to said toggle joint at D move through the same arc as the toggle arm Y. This results in both the control links N and the upper arm Y of the drag strut moving from a position in which in combination they represent a V below the actuating members K (when the undercarriage is in the position of Figure 2 through the position seen in Figure 3) to a position in which they form an inverted V above said actuating members as in Figures 4 and 5, the latter being the ultimate position when the undercarriage is fully retracted; this is also the broken line position of Figure 1. Both the control links and the upper arm Y of the drag strut assume an approximately horizontal position when the toggle joint swings into the same horizontal plane as that containing said fixed pivot B and Figure 3 shows the parts just approaching such a position. When the parts have reached the final position (Figure 5) the main shock strut J occupies a substantially horizontal position in the well G with the lower arm X of the toggle strut inclined upwardly from the main shock strut.

When the undercarriage is again extended to the landing position the actuating members are slid in the opposite direction and the operation of the parts is reversed.

From the foregoing it will be appreciated that the primary object of the invention is achieved as very little effort indeed is required to operate the mechanism and further the arrangement of the links is such that whilst the mechanism is located positively in either position of the undercarriage it will readily respond to the movement of the runner members.

I claim:

An undercarriage retractable into a well of an aircraft, comprising, guide means at each longitudinal side of the well and disposed approximately parallel to the axis of the aircraft, actuating elements slidable in said guide means, a rectilinearly rigid main shock strut mounted for pivoting movement at its upper end to the aircraft below the guide means, the axis of pivoting being at right angles to the guide means and actuating means, a drag strut including upper and lower toggle arms pivotally connected at their outer ends respectively to the aircraft and the main shock strut and disposed in rectilinear relation when the main strut is projected to landing position, a toggle pivot pin connecting the inner ends of said arms, and the upper arm of the toggle which connects with the aircraft being pivotally connected therewith at a fixed point to the rear of the rear end of the slidable actuating means when the main strut is projected to landing position, said point located in a plane lying between parallel planes intersecting the guide means and the pivot which connects the main strut with the aircraft, and a control link including members having their lower ends pivotally connected with the toggle pivot pin and having their upper ends connected with the rear ends of the said actuating elements which lie forwardly of said fixed point when said main strut is projected to landing position, and whereby, when the actuating means is moved rearwardly the elements of said control link pull the toggle pivot pin inwardly and upwardly to bring both arms of the drag strut into registry and also beyond registry until the toggle pivot pin lies in a plane rearwardly of a plane perpendicular to said fixed point of pivotal connection of the upper arm of the drag strut with the aircraft, thereby to retract the main strut to a position parallel to the guide means and actuating means.

JOSEPH CLEO MARTIN.